United States Patent
Kokaram et al.

(10) Patent No.: US 9,888,255 B1
(45) Date of Patent: Feb. 6, 2018

(54) PULL FRAME INTERPOLATION

(71) Applicant: GOOGLE INC., Mountain View, CA (US)

(72) Inventors: Anil Kokaram, Sunnyvale, CA (US); Damien Kelly, Sunnyvale, CA (US); Andrew Joseph Crawford, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/079,251

(22) Filed: Mar. 24, 2016

Related U.S. Application Data

(63) Continuation of application No. 13/853,354, filed on Mar. 29, 2013, now Pat. No. 9,300,906.

(51) Int. Cl.
*H04N 19/577* (2014.01)
*H04N 19/59* (2014.01)
*H04N 19/587* (2014.01)
*H04N 19/52* (2014.01)
*H04N 19/527* (2014.01)
(Continued)

(52) U.S. Cl.
CPC ......... *H04N 19/577* (2014.11); *H04N 19/194* (2014.11); *H04N 19/44* (2014.11); *H04N 19/52* (2014.11); *H04N 19/527* (2014.11); *H04N 19/53* (2014.11); *H04N 19/553* (2014.11); *H04N 19/587* (2014.11); *H04N 19/59* (2014.11); *H04N 19/597* (2014.11)

(58) Field of Classification Search
None
See application file for complete search history.

(56) References Cited

U.S. PATENT DOCUMENTS 5,327,241 A * 7/1994 Ishizu .................. H04N 7/0152
                                                        348/424.1
6,594,313 B1 * 7/2003 Hazra ................... H04N 7/014
                                                        348/E7.013
(Continued)

OTHER PUBLICATIONS

Xu, Li, Jianing Chen, and Jiaya Jia. "A segmentation based variational model for accurate optical flow estimation." Computer Vision—ECCV 2008 (2008): 671-684.*

*Primary Examiner* — Michelle M Hausmann
(74) *Attorney, Agent, or Firm* — Young Basile Hanlon & MacFarlane, P.C.

(57) ABSTRACT

A method for pull frame interpolation includes receiving an encoded bitstream including information representing a plurality of frames of video data, decoding the plurality of frames, including identifying a plurality of motion vectors indicating motion from a first frame of the plurality of video frames to a second frame of the plurality of video frames, identifying an interpolation point between the first frame and the second frame, identifying a plurality of candidate interpolation motion vectors indicating motion from the first frame to the interpolation point and from the second frame to the interpolation point based on the plurality of motion vectors, selecting an interpolation motion vector from the plurality of candidate interpolation motion vectors based on a metric, and generating an interpolated frame at the interpolation point based on the selected interpolation motion vector, which may include correcting an artifact in the interpolated frame by blending the interpolated frame.

18 Claims, 12 Drawing Sheets

(51) Int. Cl.
  *H04N 19/597* (2014.01)
  *H04N 19/53* (2014.01)
  *H04N 19/194* (2014.01)
  *H04N 19/553* (2014.01)
  *H04N 19/44* (2014.01)

(56) References Cited

U.S. PATENT DOCUMENTS

| | | | | |
|---|---|---|---|---|
| 6,990,148 B2* | 1/2006 | Yang | | H04N 5/145 |
| | | | | 348/E5.066 |
| 7,020,201 B2* | 3/2006 | Luo | | H04N 5/145 |
| | | | | 348/E5.066 |
| 7,346,109 B2* | 3/2008 | Nair | | H04N 7/014 |
| | | | | 348/E5.066 |
| 7,852,937 B2* | 12/2010 | Hubrich | | H04N 7/014 |
| | | | | 375/240.16 |
| 8,111,754 B1* | 2/2012 | Demos | | H04N 19/61 |
| | | | | 375/240.16 |
| 8,184,200 B1* | 5/2012 | Biswas | | H04N 7/014 |
| | | | | 348/443 |
| 9,565,446 B2* | 2/2017 | Oh | | H04N 19/105 |
| 9,621,916 B2* | 4/2017 | Oh | | H04N 19/52 |
| 9,635,308 B2* | 4/2017 | Schoenblum | | H04N 7/0127 |
| 9,693,052 B2* | 6/2017 | Fujibayashi | | H04N 19/52 |
| 9,788,009 B2* | 10/2017 | Schwarz | | H04N 19/50 |
| 2003/0012280 A1* | 1/2003 | Chan | | H04N 19/895 |
| | | | | 375/240.16 |
| 2003/0086498 A1* | 5/2003 | Lee | | H04N 5/145 |
| | | | | 375/240.16 |
| 2004/0022419 A1* | 2/2004 | Kesaniemi | | G06T 7/269 |
| | | | | 382/107 |
| 2007/0242748 A1* | 10/2007 | Mahadevan | | H04N 19/85 |
| | | | | 375/240.14 |
| 2009/0110076 A1* | 4/2009 | Chen | | G06T 7/20 |
| | | | | 375/240.16 |
| 2009/0213936 A1* | 8/2009 | Hamano | | H04N 19/139 |
| | | | | 375/240.16 |
| 2009/0290848 A1* | 11/2009 | Brown | | H04N 5/232 |
| | | | | 386/223 |
| 2010/0053451 A1* | 3/2010 | Seong | | H04N 7/0132 |
| | | | | 348/699 |
| 2010/0283892 A1* | 11/2010 | Zhou | | H04N 5/145 |
| | | | | 348/441 |
| 2010/0315550 A1* | 12/2010 | Yokoyama | | H04N 19/597 |
| | | | | 348/452 |
| 2012/0044998 A1* | 2/2012 | Kokaram | | G06T 7/238 |
| | | | | 375/240.16 |
| 2012/0154675 A1* | 6/2012 | Nasu | | H04N 7/014 |
| | | | | 348/452 |
| 2013/0314442 A1* | 11/2013 | Langlotz | | G06T 19/006 |
| | | | | 345/633 |
| 2014/0362923 A1* | 12/2014 | Nio | | H04N 7/014 |
| | | | | 375/240.16 |

* cited by examiner

PULL FRAME INTERPOLATION

CROSS-REFERENCE TO RELATED APPLICATIONS

This application is a continuation of U.S. patent application Ser. No. 13/853,354, filed on Mar. 29, 2013, which is incorporated herein by reference in its entirety.

TECHNICAL FIELD

This application relates to video frame interpolation.

BACKGROUND

Digital video can be used, for example, for remote business meetings via video conferencing, high definition video entertainment, video advertisements, or sharing of user-generated videos. Accordingly, it would be advantageous to provide temporal and spatial frame interpolation.

SUMMARY

This application relates to encoding and decoding of video stream data for transmission or storage. Disclosed herein are aspects of systems, methods, and apparatuses for pull frame interpolation.

An aspect is a method for pull frame interpolation which may include receiving an encoded bitstream including information representing a plurality of frames of video data, decoding, by a processor in response to instructions stored on a non-transitory computer readable medium, the plurality of frames. The decoding may include identifying a plurality of motion vectors indicating motion from a first frame of the plurality of video frames to a second frame of the plurality of video frames, identifying an interpolation point between the first frame and the second frame, identifying a plurality of candidate interpolation motion vectors indicating motion from the first frame to the interpolation point and from the second frame to the interpolation point based on the plurality of motion vectors, selecting an interpolation motion vector from the plurality of candidate interpolation motion vectors based on a metric, and generating an interpolated frame at the interpolation point based on the selected interpolation motion vector. Generating the interpolated frame may include correcting an artifact in the interpolated frame based on the interpolation motion vector by blending the interpolated frame with an average of the first frame and the second frame, the blending being based on a gradient of a motion field associated with the interpolation motion vector.

Another aspect is a decoder for processing a coded video stream that contains a plurality of frames. The decoder may include a processor and a memory, communicatively coupled to the processor, the memory storing a plurality of instructions that cause the processor to receive an encoded bitstream including information representing a plurality of frames of video data, and decode the plurality of frames, which may include identifying a plurality of motion vectors indicating motion from a first frame of the plurality of video frames to a second frame of the plurality of video frames, identifying an interpolation point between the first frame and the second frame, identifying a plurality of candidate interpolation motion vectors indicating motion from the first frame to the interpolation point and from the second frame to the interpolation point based on the plurality of motion vectors, selecting an interpolation motion vector from the plurality of candidate interpolation motion vectors based on a metric, and generating an interpolated frame at the interpolation point based on the selected interpolation motion vector. Generating the interpolated frame may include correcting an artifact in the interpolated frame based on the interpolation motion vector by blending the interpolated frame with an average of the first frame and the second frame, the blending being based on a gradient of a motion field associated with the interpolation motion vector.

Another aspect is a decoder for processing a coded video stream that contains a plurality of frames. The decoder may include a processor and a memory, communicatively coupled to the processor, the memory storing a plurality of instructions that cause the processor to receive an encoded bitstream including information representing a plurality of frames of video data, and decode the plurality of frames, which may include selecting an interpolation motion vector from a plurality of candidate interpolation motion vectors based on a metric, and generating an interpolated frame at an interpolation point between a first frame and a second frame based on the selected interpolation motion vector. Generating the interpolated frame may include correcting an artifact in the interpolated frame based on the interpolation motion vector by blending the interpolated frame with an average of the first frame and the second frame, the blending being based on a gradient of a motion field associated with the interpolation motion vector.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. The generation and display of a video signal may be performed at different frame rates. Pull frame interpolation may be performed to convert from one frame rate to another or to generate temporal or spatial video effect, such as a slow motion effect.

Video signal generation may include generating a video signal in an analog or digital format. Some formats may include interlaced images of two fields each, wherein half of the lines available in each frame are sampled at each time instant (or frame sampling period). The number of frames per time unit (frame rate) may vary and conversion may be performed to convert from one frame rate to another. Non-motion compensated frame rate conversion, which may be based on dropping or repeating frames, may not preserve motion well. Motion compensated frame rate conversion, such as frame interpolation, which may better preserve motion, may include generating new, interpolated, frames using motion information from the video signal.

Pull frame interpolation may be used for frame rate conversion. In some implementations, pull frame interpolation may be used to generate temporal or spatial video effects. For example, pull frame interpolation may generate additional frames to transition into and out of a slow motion effect, or to interpolate frames between spatially proximate input frames to produce a space-move effect.

Pull frame interpolation may include generating interpolated frames using motion information pulled from consecutive existing frames. The motion information may be generated by any motion estimator. Interpolated motion may be generated independently of picture interpolation. Pull frame interpolation may include optimization based on candidate motion vector selection. Post-processing may be performed to, for example, improve handling of blur or low quality input data. In some implementations, pull frame interpolation may include using a multiresolution multipass scheme to improve performance of, for example, input including large amounts of motion.

Figure 1:
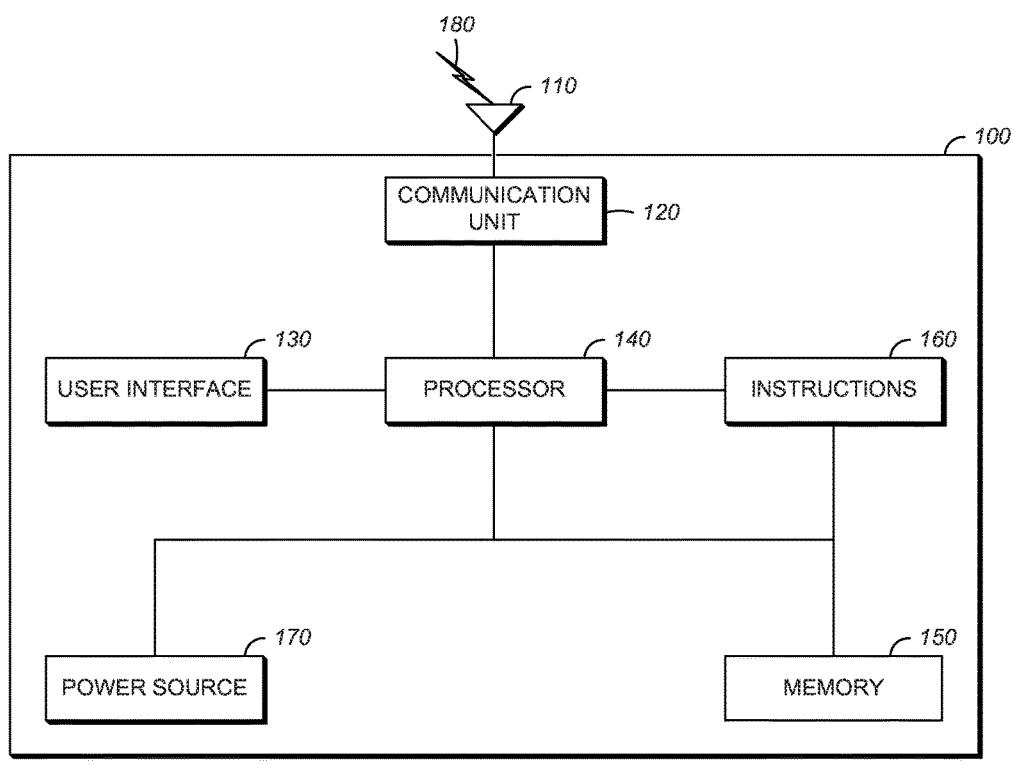
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
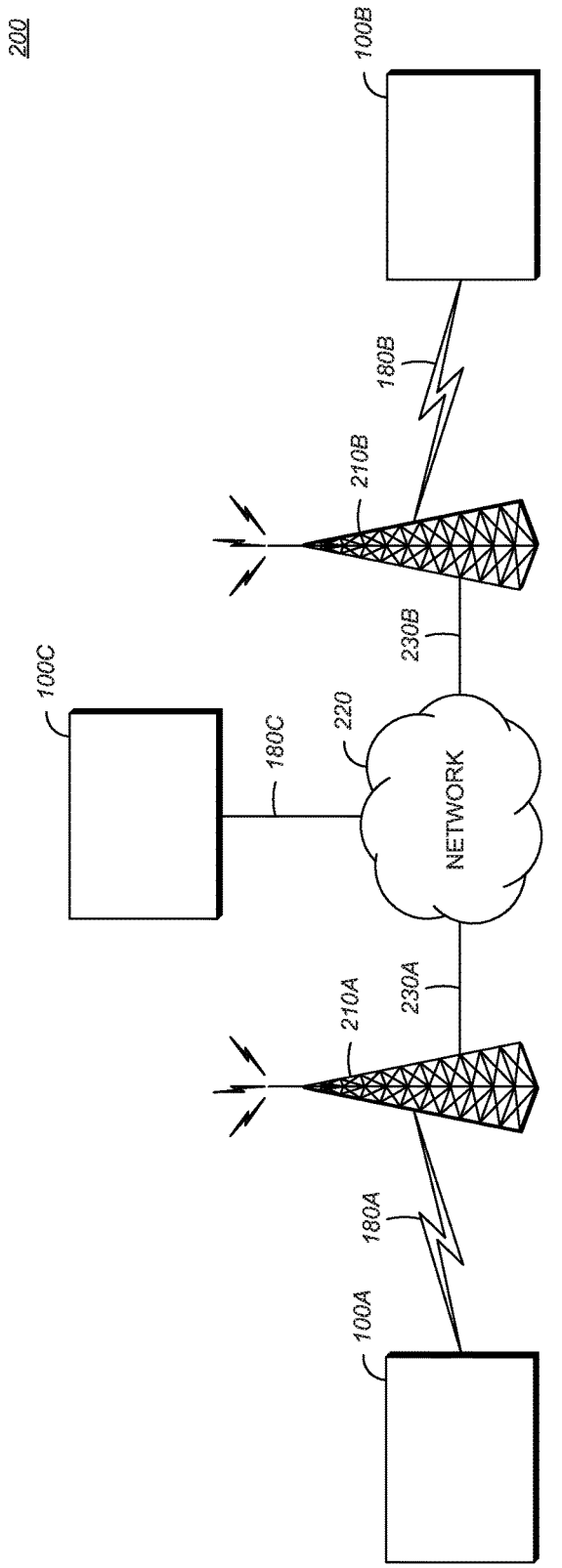
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
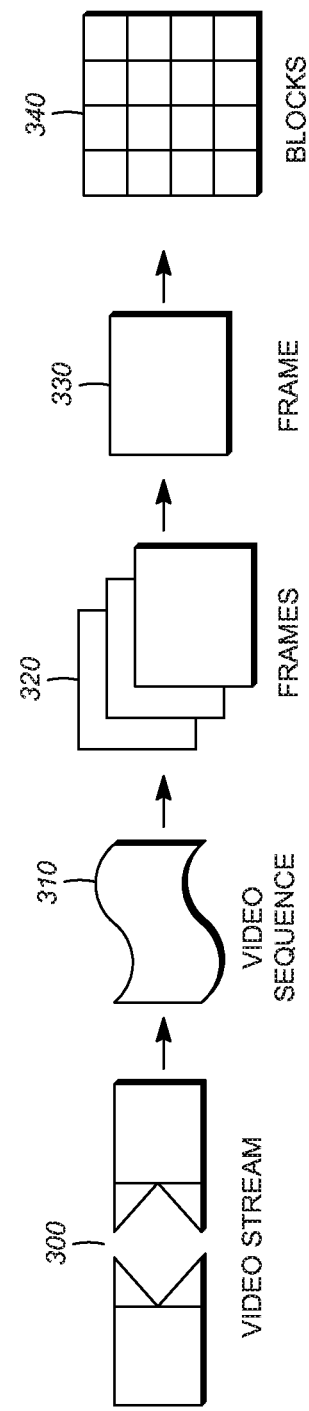
FIG. 3 is a diagram of a video stream for use in frame interpolation in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
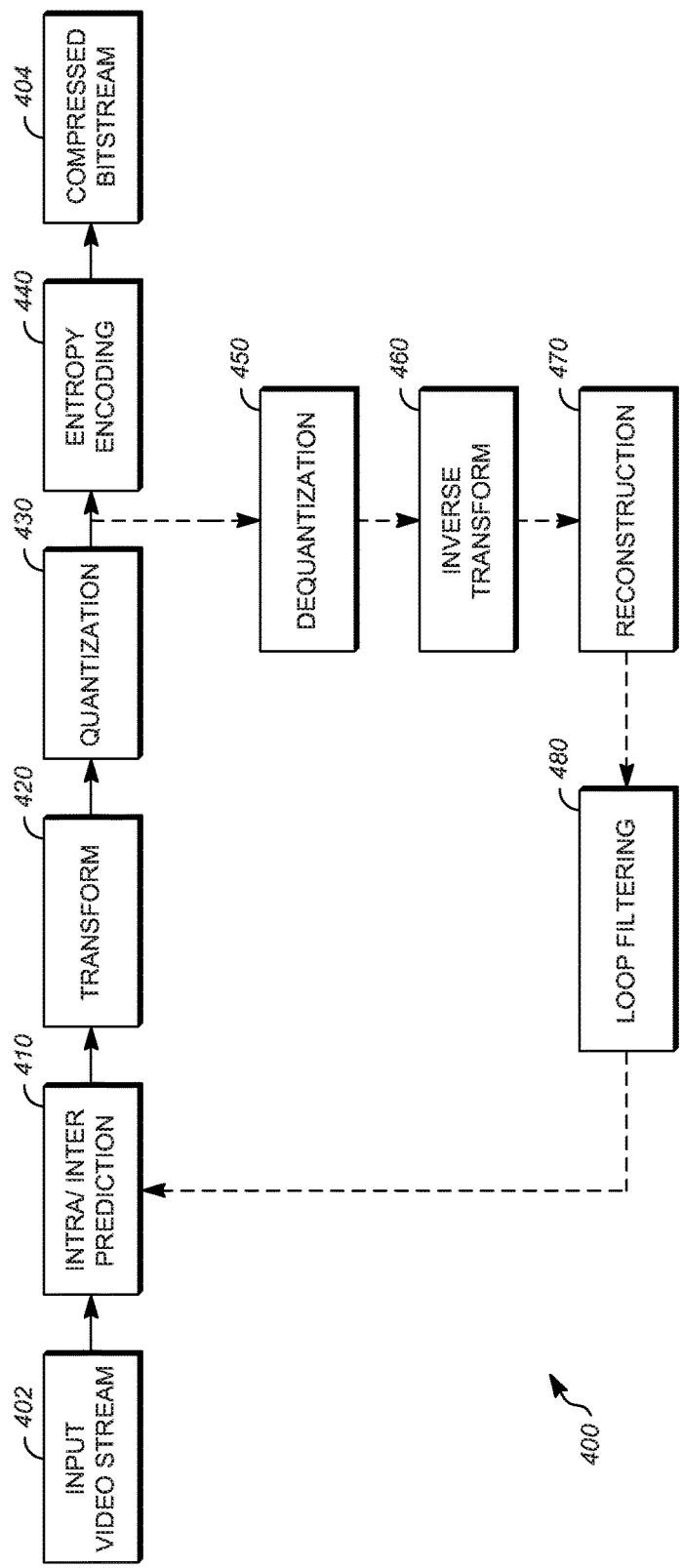
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
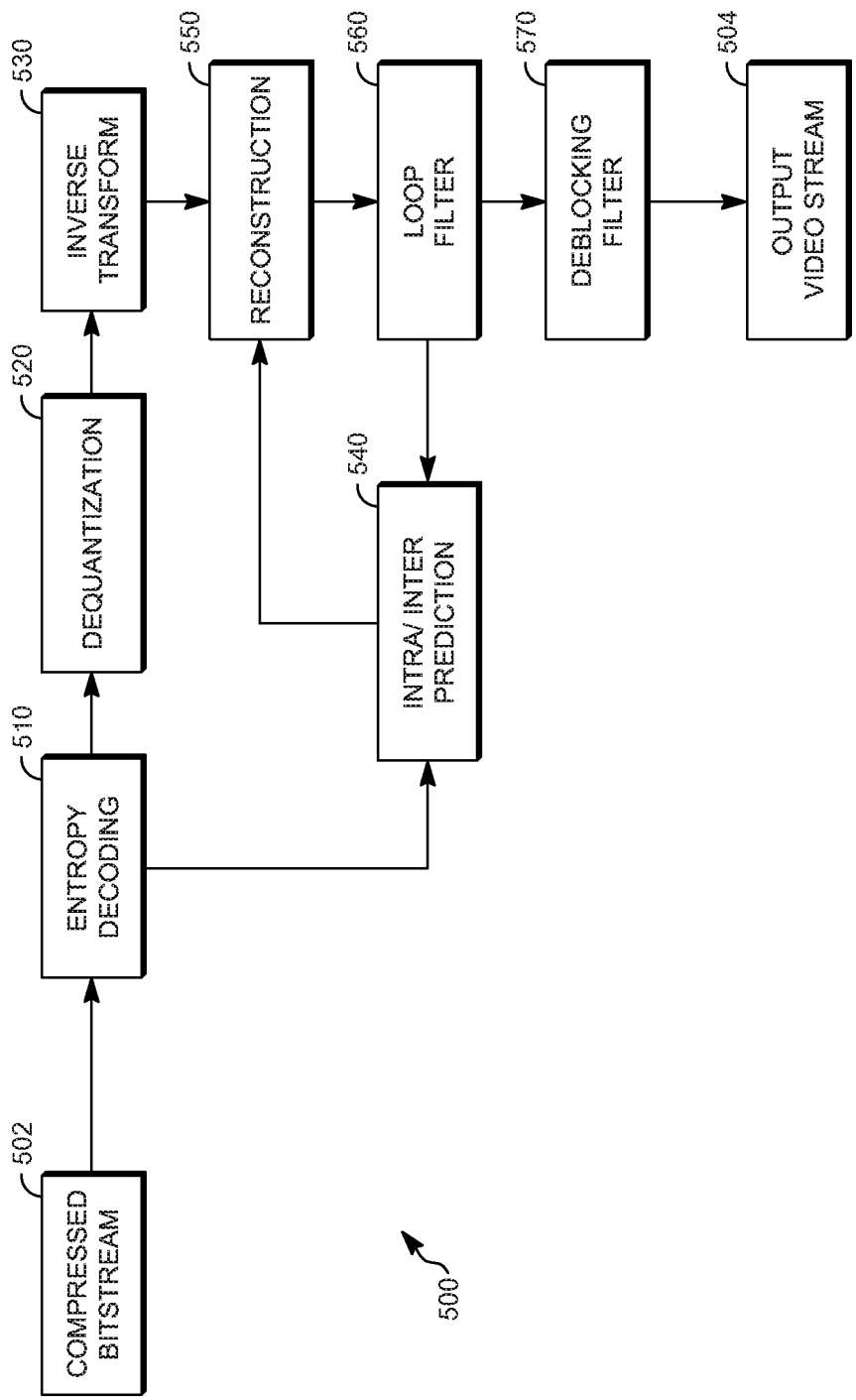
FIG. 5 is a block diagram of a decoder 500 in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
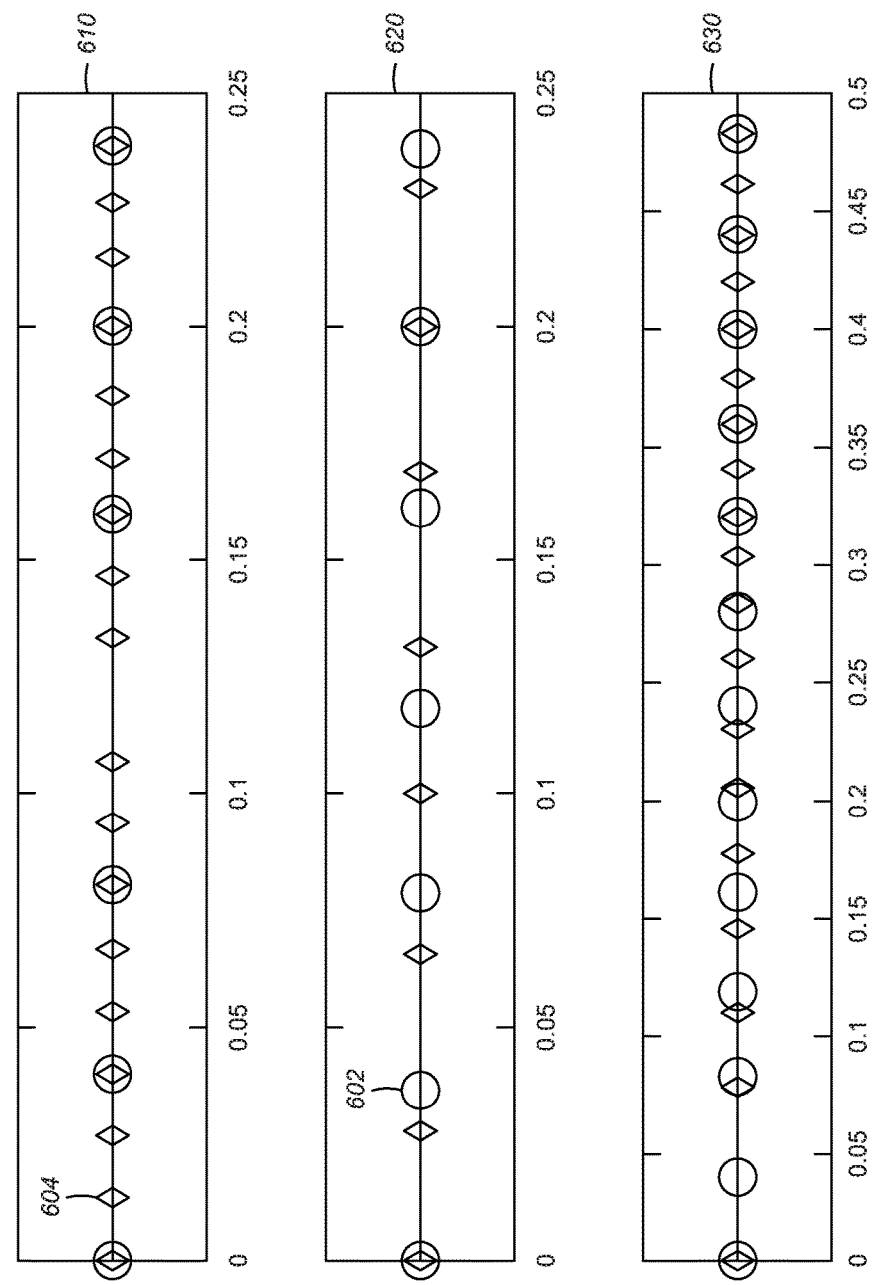
FIG. 6 shows examples of timelines for video frame rate conversion in accordance with implementations of this disclosure.

FIG. 6 shows examples of timelines for video frame rate conversion in accordance with implementations of this disclosure. In some implementations, video frame rate conversion may be performed by a unit, such as the encoder 400 shown in FIG. 4, of a device, such as the computing device 100 shown in FIG. 1, to convert a frame rate of an input video stream, such as the video stream 300 shown in FIG. 3, to an output video stream. As shown, each frame 602 of an input video stream is indicated by a circle and each interpolated output frame 604 for a corresponding output video stream is indicated by a diamond.

The top timeline 610 shows an example of frame rate conversion wherein the output frame rate may be a multiple, such as three, of the input frame rate. For example, as shown, the input frame rate may be 25 frames per second (fps) and the output frame rate may be 75 fps. As shown, one third of the interpolated frames 604 coincide with the original frames 602 and the remaining two thirds of the interpolated frames 604 may be in-between the original frames 602. The output may be presented at the input frame rate of 25 fps, which may produce a slow motion effect that may appear slowed down by a factor of three. A slow motion factor of three is described as an example; however, any other slow motion factor may be used.

The middle timeline 620 shows an example of frame rate conversion wherein the input frame rate may be 25 fps and the output frame rate may be 30 fps. As shown, the locations of the output frames 604 may not be evenly spaced relative to the input frames 602. The location pattern of the output frames 604 may have a periodicity that can be used for the creation of the interpolated frames 604.

The bottom timeline 630 shows an example of frame rate conversion wherein the input frame rate may be 25 fps and the output frame rate may be 50 fps, and wherein the output frame rate transitions linearly from 25 fps to 50 fps. For example, the output video sequence may show a deceleration in time, or a slow motion effect. In this last case there may not be a simple periodicity to the output frame location in time.

In some implementations, conversion between one frame or field rate and another may include non-motion compensating conversion, which may include repeating frames, as in zero-order hold conversion, or dropping frames, as in subsampling conversion. For example, converting 30 fps (60 fields per second) interlaced video to 25 fps (50 fields per second) interlaced video may include dropping 50 fields out of every 300 fields from the 30 fps source. Thus, one field may be dropped for every six fields from the source. Convert from 25 fps interlaced to 30 fps interlaced may include repeating one field in every six from the source. Dropping or repeating fields produce low quality converted pictures wherein one frame in every six may have a wrong field merged into a frame. That may result in poorly represented motion, which may be perceived like a stutter effect in the converted material. In some implementations, a missing field may be estimated by interpolating it from the given video data. For example, at a given time, an odd field may be estimated from an even field by averaging lines vertically. In a subsequent time, the estimated field may be repeated or an original field may be dropped.

Non-motion compensating conversion may not preserve motion well. For example, a large amount of motion, such as motion of five pixels per frame, may not be well preserved. Conversion to progressive formats or between progressive formats may not preserve motion well. In some implementations, conversion may include motion compensated techniques that use motion information derived from the video data. Motion compensated conversion may include interpolating new fields or frames by directing the interpolation along motion trajectories. Motion compensated conversion may include handling occlusion, wherein a portion of a frame is hidden in one frame and visible in another. A portion of a frame that is occluded, in one frame or another, may not be available for use in conversion.

In some implementations, motion compensation may be performed by dedicated motion compensation hardware, such as circuitry. For example, real time conversion may be implemented using motion compensation circuitry. Hardware based motion compensation may have relatively limited complexity compared to motion compensation implemented in software or in a combination of hardware and software.

In some implementations, motion compensation may be implemented in software, such as post-production software. For example, software based conversion may be used to create slow-motion effects in videos, such as movies and cinemas. Software based non-real-time conversion may include interpolating frames at arbitrary points in time or space. Thus, conversion may include decelerating a frame rate to create a slow-motion effect, and accelerate the frame rate to transition out of the slow-motion effect.

In some implementations, conversion may include interpolating among non-temporally sequential frames. For example, spatially sequential frames may be interpolated to create an effect, such as a smooth space-move effect. In some implementations, spatially sequential frames may be captured concurrently, or near concurrently.

In some implementations, image data from existing frames may be pushed into interpolated frames along contours of least gradient between relevant images. Push interpolation may include copying pixel values from existing frames into interpolated frames. Push interpolation may produce convincing frame interpolation, but may not be optimal along directions of motion. For example, the motion fidelity of the conversion may not be accurate when an input video sequence is viewed at the target frame rate.

In some implementations, frame interpolation may include recovering missing frames in archived motion picture film and video footage. Frame interpolation for frame recovery may include reconstructing a frame at an arbitrary time instant by recovering the motion field at that instant.

Figure 7:
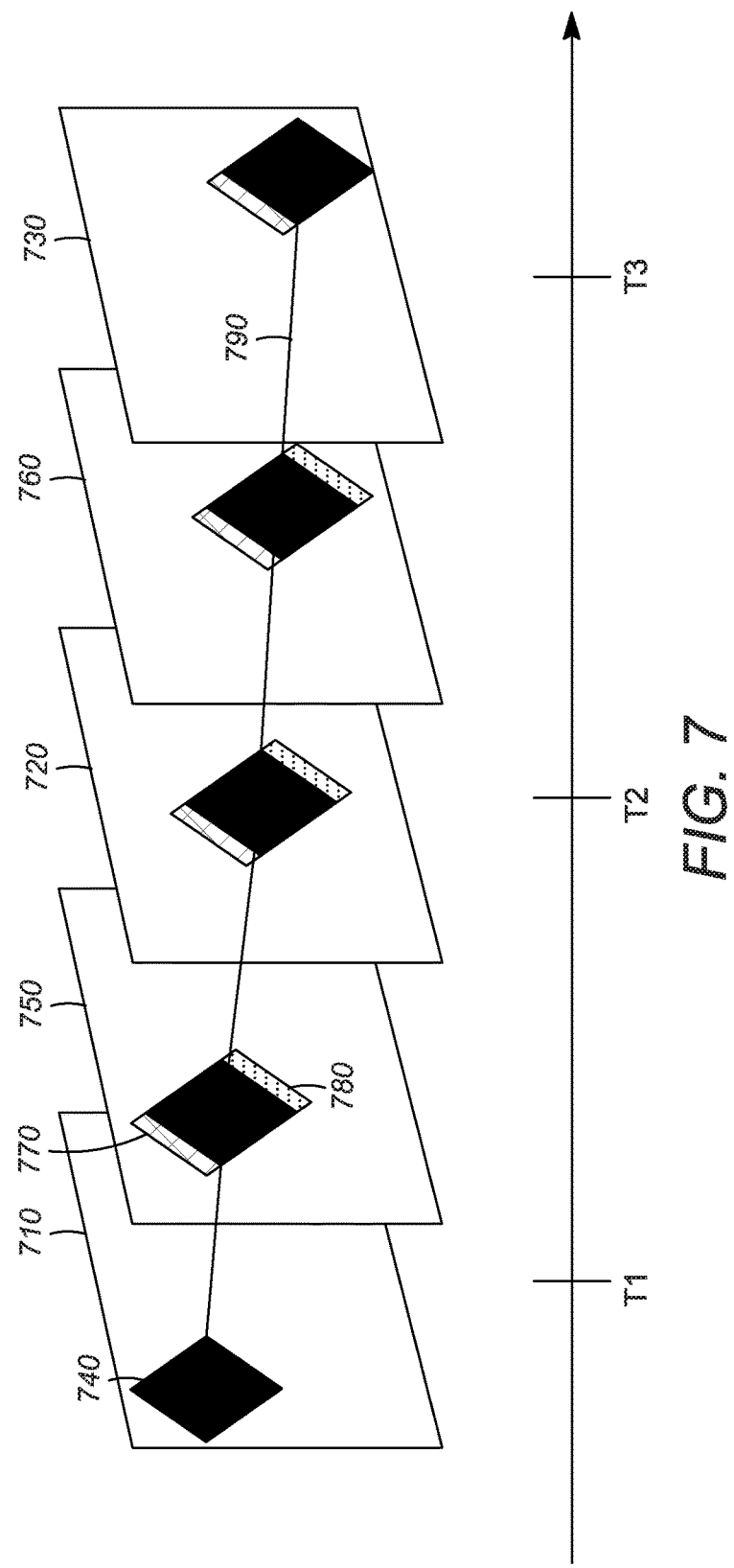
FIG. 7 shows a diagram of an example of pull frame interpolation in accordance with implementations of this disclosure.

FIG. 7 shows a diagram of an example of pull frame interpolation in accordance with implementations of this disclosure. Input frames 710/720/730 capture an object 740, indicated by a diamond shape, moving from the top left to the bottom right of a simplified scene. As shown in FIG. 7, scene includes a plain white background; however, the scene may include other content. An interpolated frame 750 between the first frame 710 and the second frame 720, and an interpolated frame 760 between the second frame 720 and the third frame 730 are shown using broken lines.

For example, the first input frame 710 may capture the scene at a first point in time T1, the second input frame 720 may capture the scene at a second point in time T2, and the third input frame 730 may capture the scene at a third point in time T3. The first interpolated frame 750 may interpolate the scene at a point in time between the first point in time T1 and the second point in time T2, and the second interpolated frame 760 may interpolate the scene at a point in time between the second point in time T2 and the third point in time T3.

In some implementations, pull frame interpolation may include generating a time-stop or timeslice effect, wherein a camera may appear to move through space and wherein time may appear to slow or stop. For example, a time-stop effect may be generated using frames recorded concurrently by multiple cameras placed at multiple different spatial positions during a time period. The first input frame 710 may capture the scene at a first point in space T1, the second input frame 720 may capture the scene at a second point in space T2, and the third input frame 730 may capture the scene at a third point in space T3. The input frames 710/720/730 may be capture the scene at the same, or substantially the same point in time. The first interpolated frame 750 may interpolate the scene at a point in space between the first spatial point T1 and the second spatial point T2, and the second interpolated frame 760 may interpolate the scene at a point in space between the second spatial point T2 and the third spatial point T3. The interpolated frames 750/760 may be associated with the same, or substantially the same, point in time as the input frames 710/720/730.

Occluded areas 770 of the scene, such as a background, that may be hidden by the object 740 in a frame and uncovered in a subsequent frame are shown using cross hatching. Uncovered areas 780 of the scene that may be shown in a frame and occluded in a subsequent frame are shown using stippling. A motion trajectory line 790 is also shown. In some implementations, pull frame interpolation may include preserving occluded areas 770, uncovered areas 780, and the motion trajectory 790.

In some implementations, pull frame interpolation may include estimating pixel intensities in the interpolated frames 750/760 based on the data in the input frames 710/720/730. Motion information may be used to copy pixel intensities from the input frames 710/720/730 into the locations interpolated along the direction of motion, thus building up the interpolated frames 750/760 pixel by pixel. Pixels in the occluded regions 770 may not be available for use in subsequent frames. Pixels in uncovered regions 780 may not be available for use in previous frames.

Figure 8:
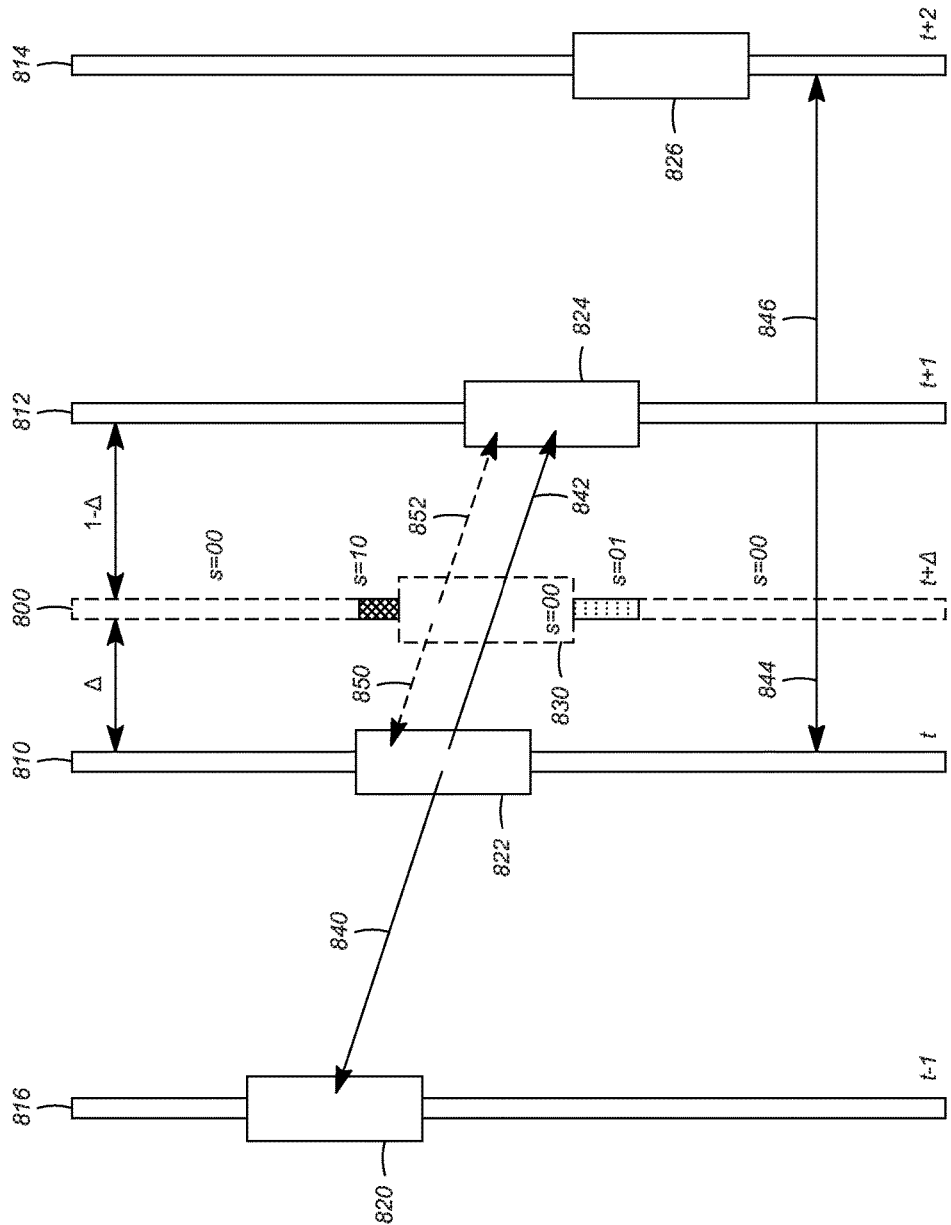
FIG. 8 shows another diagram of an example of pull frame interpolation in accordance with implementations of this disclosure.

FIG. 8 shows another diagram of an example of pull frame interpolation in accordance with implementations of this disclosure. In some implementations, pull frame interpolation may include generating an interpolated frame 800, which is shown using broken lines, between a first input frame 810 and a second input frame 812. In some implementations, pull frame interpolation may include using four input frames 810/812/814/816 to create interpolated frames between two adjacent input frames. The interpolated frame 800 may be estimated at a time, or space, instant t+Δ. Although FIG. 8 shows a single interpolated frame 800, any number of interpolated frames may be generated between the first frame 810 and the second frame 812 based on the input frames. Although pull frame interpolation based on four input frames is described herein, pull frame interpolation may be performed based on any sequence of two or more frames.

The input frames 810/812/814/816 may include a scene captured as a spatial or temporal sequence. For example, the first input frame 810 may capture the scene at a first point in time t, the second input frame 812 may capture the scene at a subsequent point in time t+1, the third input frame 814 may capture the scene at another subsequent point in time t+2, and the fourth input frame 816 may capture the scene at a previous point in time t−1. In another example, the first input frame 810 may capture the scene at a first point in space t, the second input frame 812 may capture the scene at a subsequent point in space t+1, the third input frame 814 may capture the scene at another subsequent point in space t+2, and the fourth input frame 816 may capture the scene at a previous point in space t−1. The interpolated frame 800 may be generated at a point t+Δ between the first frame 810 at t and the second frame 812 at t+1. Although one interpolated frame is shown, any number of interpolated frames may be generated at points between the first frame 810 and the second frame 812.

The interpolated frame 800 may be offset from the first input frame 810 at t by a time or space interval Δ, and from the second input frame 812 at t+1 by 1−Δ. An element of the captured scene, such as an object, is shown as a rectangle translating uniformly along the frames. For example, the object is shown at a first location 820 in the frame 816 at t−1, at a second location 822 in the frame 810 at t, at a third location 824 in the frame 812 at t+1, and at a fourth location 826 in the frame 814 at t+2. Although the object is shown as moving within the frames, the object may be stationary, or substantially stationary, within the frame and other elements of the scene, such as the background, may move relative to the object. An interpolated location 830 for the object is shown as a broken line rectangle at the interpolated frame 800 at t+Δ.

In some implementations, pull frame interpolation may include using motion estimation information, which may be generated independently of the pull frame interpolation. For example, any motion estimation technique may be used to generate motion estimation information prior to pull frame interpolation. Motion between the frame 810 at t and the frame 812 at t+1 at position x may be expressed as $d_{t,t+1}(x)$ =[$d_1$; $d_2$] where $d_1$ and $d_2$ indicate the horizontal and vertical components of the motion. The intensity of a pixel at x in frame t may be expressed as $I_t(x)$. The location of the motion compensated pixel in the previous frame may be expressed as $I_{t-1}(x+d_{t,t-1}(x))$.

The motion of the object between the frame 814 at t−1 and the frame 810 at t, which may be expressed as $d_{t,t-1}$, is shown using an example motion vector 840. The motion of the object between the frame 810 at t and the frame 812 at t+1, which may be expressed as $d_{t,t+1}$, is shown using another example motion vector 842. Background motion between the frame 812 at t+1 and the frame 810 at t, which may be expressed as $d_{t+1,t}$, is shown using an example zero motion vector 844. Background motion between the frame 812 at t+1 and the frame 814 at t+2, which may be expressed as $d_{t+1,t+2}$, is shown using another example motion vector 846.

The interpolated motion between the interpolated frame 800 at t+Δ and the frame 810 at t may be expressed as $d_{t+\Delta,t}$, and the interpolated motion between the interpolated frame 800 at t+Δ and the frame 812 at t+1 may be expressed as $d_{t+\Delta,t+1}$.

In some implementations, pull frame interpolation may include using occlusion state information. The occlusion state information may include an occlusion state associated with each pixel in a frame. For example, the occlusion state associated with the pixel at position x of frame t may be expressed as $s_t(x)=[00; 01; 10]$, wherein $s_t(x)=00$ indicates that the pixel is not occluded in the next and previous frames, $s_t(x)=01$ indicates that the pixel is occluded in the next frame (forward occlusion), and $s_t(x)=10$ indicates that the pixel is occluded in the previous frame (backward occlusion). The association of each position in the interpolated frame 800 at t+Δ with an occlusion state is indicated at t+Δ using crosshatching and stippling respectively. The occlusion state of the interpolated image data corresponding to content of the scene which exists in the frame 810 at t and the frame 812 at t+1 may be expressed as s=00. The occlusion state of the interpolated image data corresponding to the patch which does not exist, or is occluded, in the frame 810 at t and exists, or is uncovered, in the frame 812 at t+1 may be expressed as s=10. The occlusion state of the interpolated image data corresponding to the patch which exists in the frame 810 at t and does not exist, or is occluded, in the frame 812 at t+1 may be expressed as s=01.

In some implementations, a pull frame interpolation model may be expressed as the following:

$$I_{t+\Delta}(x) = \begin{cases} 0.5[I_{t-1}(x+d_{t,t-1}(x)) + I_{t+1}(x+d_{t+\Delta,t+1}(x))] & s=00 \\ I_{t-1}(x+d_{t+\Delta,t-1}(x)) & s=01 \\ I_{t+1}(x+d_{t+\Delta,t+1}(x)) & s+10 \end{cases}$$ [Equation 1]

Pull frame interpolation may include estimating motion fields between the interpolated frame 800 at t+Δ and the input frame 810 at t, and between the interpolated frame 800 at t+Δ and the input frame 812 at t+1, and may include estimating the states of the pixels $s_{t+\Delta}(x)$. Interpolating motion at t+Δ may be referred to as a pull process, and may include using the motion at the interpolated frame 800 at t+Δ to pull pixels from the input frame 810 at t and the input frame 812 at t+1 to create the image $I_t+\Delta$ using Equation 2.

In some implementations, D, i may include existing motion estimates and image data, $d_-(x)$ may collect motion in the interpolated frame in proximity to a current site, and manipulating the posterior probability distribution $p(d_{t+\Delta;t+1}, d_{t+\Delta,t}|D, i)$ in a Bayesian fashion may be expressed as the following:

$$p(d_{t+\Delta,t+1}(x), d_{t+\Delta,t}(x), s(x) | D, i) = \quad \text{[Equation 2]}$$
$$p(i | d_{t+\Delta,t+1}(x), d_{t+\Delta,t}(x), s(x)) \times$$
$$p(d_{t+\Delta,t+1}(x), d_{t+\Delta,t}(x) | D, s(x)) \times$$
$$p(d_{t+\Delta,t} | d_{-(x)}, s(x)) \times p(d_{t+\Delta,t+1} | d_{-(x)}, s(x)) \times p(s(x))$$

The estimate for $d_{t+\delta}$, used as the interpolated motion, may maximize the posterior in Equation 2.

In some implementations, pull frame interpolation may include using image likelihood. Image likelihood may be used such that $e_I(x) = I_t(x+d_{t+\Delta,t}) - I_{t+1}(x+d_{t+\Delta,t+1})$ may indicate the motion compensated motion compensated pixel difference between the pixel in the next frame and the pixel in the previous frame. For example, an image may be a color image, and $e_I$ may be is a vector of three differences corresponding to the three color planes. In some implementations, the interpolated motion may be accurate and the differences corresponding to the three color planes may be small unless occlusion occurs.

In some implementations, image data at t+Δ may not be known a-priori and, motion may be used to explicitly incorporate s(•), which may be expressed as follows:

$$p(i | d_{t+\Delta,t+1}(x), d_{t+\Delta,t}(x)) \propto \begin{cases} \exp-\dfrac{e_I^2(x)}{2\sigma_I^2} & s(x)=00 \\ \exp-k_I & s(x)=01, 10 \end{cases} \quad \text{[Equation 3]}$$

In some implementations, $k_I$ may equal $10\times2.7^2$ to allow for a strong bias away from occlusion in the image data. In color images $e_I^2$ may be the scaled vector magnitude, such as the average of the square of the three difference components. In some implementations, $\sigma_I^2$ can be measured from the pixel data or may be set to 1:0.

In some implementations, pull frame interpolation may include motion likelihood. Motion likelihood may be used such that the true interpolated motion may agree with the motion already estimated between the existing frames. Pull frame interpolation may include maximizing motion agreement by encouraging motion compensated motion differences to be small. Encouraging motion compensated motion differences to be small may include expressing the motion compensated motion differences as follows:

$$e_f = |d_{t+\Delta,t+1} - (1-\Delta)d_{t+1,t+2}(x+d_{t+\Delta,t+1})| \quad \text{[Equation 4]}$$

$$e_b = |d_{t+\Delta,t} - \Delta d_{t,t-1}(x+d_{t+\Delta,t})| \quad \text{[Equation 5]}$$

$$e_{fb} = |d_{t+\Delta,t+1} + (1-\Delta)d_{t+1,t}(x+d_{t+\Delta,t+1})| \quad \text{[Equation 6]}$$

$$e_{bf} = |d_{t+\Delta,t} + \Delta d_{t,t+1}(x+d_{t+\Delta,t})| \quad \text{[Equation 7]}$$

$$e_d = \left|\dfrac{d_{t+\Delta,t}}{1-\Delta} + \dfrac{d_{t,t+1}}{\Delta}\right| \quad \text{[Equation 8]}$$

In Equations 4-8, the x argument in the interpolated motion fields $d_{t+\Delta}$ is omitted for clarity.

In some implementations, s(•) may be incorporated and the motion likelihood may be expressed as follows:

$$p(d_{t+\Delta,t+1}(x), d_{t+\Delta,t}(x) \mid D) = \quad \text{[Equation 9]}$$

$$\begin{cases} \exp -\dfrac{e_f^2 + 4\alpha + 2e_d^2}{2\sigma_d^2} & s(x) = 10 \\ \exp -\dfrac{e_b^2 + 4\alpha + 2e_d^2}{2\sigma_d^2} & s(x) = 01 \\ \exp -\dfrac{e_{fb}^2 + e_{bf}^2 + e_f^2 + e_b^2 + 2e_d^2}{2\sigma_d^2} & s(x) = 00 \end{cases}$$

In Equation 9 α may represent penalty energies that may balance the loss of temporal continuity in occluded states 10, 01 and discourage the occurrence of occluded states. $e_d$ may penalize motion vector pairs which show acceleration. The motion likelihood for state s(•)=00 may encourage the interpolated motion to align with existing motion between frames t,t−1; t,t+1; t+1, t+2. In the other states (01; 10) temporal smoothness may be encouraged with motion between t,t−1 and t=1,t+2 respectively.

Figure 9:
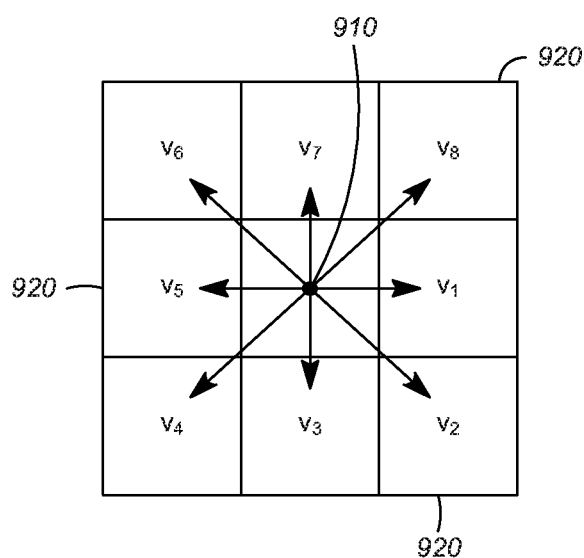
FIG. 9 shows a diagram of an example of proximate neighbours in a site grid in accordance with implementations of this disclosure.

FIG. 9 shows a diagram of an example of proximate (adjacent) neighbors in a site grid 900 in accordance with implementations of this disclosure. In a representation of a frame as a grid a current pixel 910 may have eight proximate neighbors 920.

In some implementations, pull frame interpolation may include using motion priors. In an example, the motion fields may be Markov Random Fields. A motion prior may consists of two factors, $p_d(\bullet)$ which may enforce spatial smoothness of the estimated motion field, and $p_g(\bullet)$ which may penalize large deviations in the motion field from a pre-computed estimate for global motion. Spatial smoothness of the interpolated motion fields may be enforced using the usual Gibbs energy prior which may be expressed as follows:

$$p_d(d_{t+\Delta,t} \mid d_{-(x)}) \propto \quad \text{[Equation 10]}$$

$$\exp -\Lambda_d \left\{ \sum_{k=0}^{K-1} \lambda_d f(\mid d_{t+\Delta,t}(x) - d_{t+\Delta,t}(x-v_k) \mid) \right\}.$$

Motion in the opposite direction may be expressed similarly. In Equation 10, $\Lambda_d$ may control the strength of the smoothness. For example, $\Lambda_d$=2.0 may be used. The contribution from each of the clique terms may be weighted with $\lambda_k$ inversely with their distance from x. For example, $\lambda_k$=1/|$v_k$| may be used. In some implementations, K may be eight, such that the eight pixels proximate to the current pixel may be indexed with $v_k$.

As shown in FIG. 9, the offset vectors may have unit values in the horizontal and vertical directions. In some implementations, f(•) may be a robust function which may be expressed as follows:

$$f(a) = \begin{cases} a & |a| < 10.0 \\ 10.0 & \text{Otherwise} \end{cases} \quad \text{[Equation 11]}$$

In some implementations, $d_g$ may be a pre-computed estimate for the global (or camera) motion of the interpolated frames, f(•) may be a robust function, such as the function expressed in Equation 11, and $p_g(\bullet)$ may be expressed as follows:

$$p_g(d_{t+\Delta,t} \mid d_g) \propto \exp -\Lambda_g f(d_{t+\Delta,t}(x) - d_g). \quad \text{[Equation 12]}$$

In some implementations, the motion in the current frame may be encouraged to 'snap' to the global motion of the camera when sensible. In some implementations, a low strength constraint, such as Λg=01, may be employed. In some implementations, the constraint may be turned off for robustness, such as Λg=0.

In some implementations, pull frame interpolation may include using occlusion priors. A prior for occlusion p(s(•)) may encourage spatial smoothness in the estimated states and may be expressed as the following:

$$p_s(s \mid s_{-(x)}) \propto \exp -\Lambda_o \left\{ \sum_{k=0}^{K-1} \lambda_k h(s, s(x+v_k)) \right\}. \quad \text{[Equation 13]}$$

In Equation 13, $h(s_1; s_2)$ may be an energy function that assigns energies according to the state pairs $(s_1; s_2)$ which may be expressed as follows:

$$h(s_1, s_2) = \quad \text{[Equation 14]}$$

$$\begin{cases} 0.5[I_{t-1}(x + d_{t,t-1}(x)) + I_{t+1}(x + d_{t+\Delta,t+1}(x))] & s = 00 \\ I_{t-1}(x + d_{t+\Delta,t-1}(x)) & s = 01 \\ I_{t+1}(x + d_{t+\Delta,t+1}(x)) & s + 10 \end{cases}$$

The energy function expressed in Equation 13 may discourage occlusion states 01 and 10 from sharing a boundary and may encourage the states to be the same in proximity. The energy function may encourage spatial smoothness in the occlusion states, such as in a group of proximate pixels. For example, the states of the eight pixels proximate to a current pixel are 01, the energy function may encourage the state at the current site to be the 01. In another example, the states of five sites around a current site may be 00, and the energy function may encourage the current site to be 00, which may produce in the smoothest configuration in the local area.

The energy function also serves to prevent 01 and 10 from being close together in that 8 nearest neighbourhood.

The energy function expressed in Equation 13 may be used to identify the unknown motion $d_{t+\Delta}$, which may include optimizing Equation 2 using, for example, Graph Cuts, Belief Propagation or any other local update scheme.

In some implementations, pull frame interpolation may include optimization. The computational load of pull frame interpolation may be reduced by proposing local candidates for the interpolated motion using temporal motion prediction techniques, and using the energy function expressed in Equation 13 to select an optimized candidates at each site. Motion and occlusion may be jointly estimated, rather than estimating for each in turn. The optimization process may be iterated until conclusion. In some implementations, the optimization may include Iterated Conditional Modes (ICM) optimization combined with local importance sampling. In some implementations, to facilitate candidate generation, optimization may include motion estimation, temporal hit list generation, initial estimate generation, or any combination thereof. Although described herein as elements of pull frame interpolation motion estimation, temporal hit list generation, and initial estimate generation may be performed independently prior to pull frame interpolation.

Figure 10:
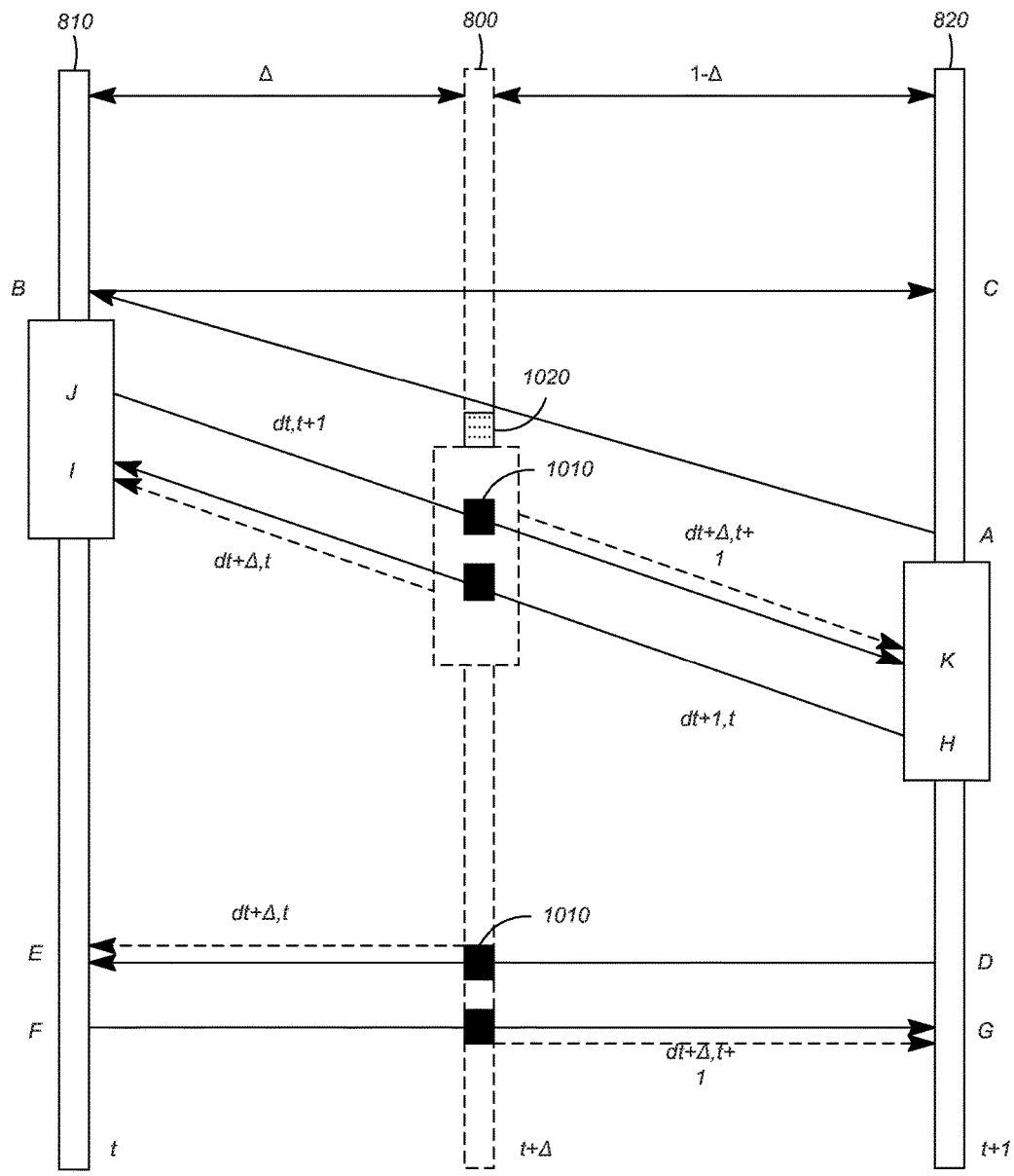
FIG. 10 shows a diagram of an example of hit list generation in accordance with implementations of this disclosure.

FIG. 10 shows a diagram of an example of generating a list of candidate interpolation motion vectors (hit list) in accordance with implementations of this disclosure. Generating the hit list may include identifying temporal and spatial candidates at each site in the interpolation frame. The computational load may be reduced by generating a list of temporal or spatial motion candidates prior to pull frame interpolation. In some implementations, such as in temporal motion prediction, the candidates may be estimated based on predicting the motion at interpolated locations by copying the motion between existing frames along their motion directions into the pixel locations at t+Δ. Each motion vector between frames t, t+1 may be used to predict candidate vectors for the interpolated field $d_{t+\Delta,\ t+1}$. Similarly, $d_{t+1,\ t}$ may be used to predict possible vectors for $d_{t+1,\ t+\Delta}$.

As shown in FIG. 10, the hit list for the interpolated frame 800 at t+Δ may be generated using motion fields $d_t$, $d_{t+1}$;·· Sites in t+Δ at which there are hits from both sides 1010 are shown as black squares, and an example of a site showing one hit 1020 (in the t+1, t direction) is shown as a stippled square. The backward vector from D→E may yield a candidate for $d_{t+\Delta,\ t}$ and the vector from F→G may yield a similar hit in the opposite direction, which may be a candidate for $d_{t+\Delta,\ t+1}$. Similar hits may be identified for JK and HI. The vector AB may yield a hit in the backward direction (white square) and there may not be a vector BA that would yield a hit. The vectors starting at B may map to C. This may be an indication of an occluded region.

In some implementations, generating a hit list may include identifying forward hits by scanning every vector $d_{t,t+1}(x)$ for all x in the frame 810 at t, and, at each site $x+\Delta d_{t,t+1}(x)$ in the frame 800 at t+Δ, storing an indication, such as a record, of $d_{t,t+1}(x)$, which may indicate a hit at that site.

In some implementations, generating a hit list may include identifying backward hits by scanning every vector $d_{t+1,t}(x)$ for each x in the frame 820 at t+1, and, at each site $x+(1-\Delta)d_{t+1,t}(x)$ in the frame 800 at t+Δ, storing an indication, such as a record, of $d_{t+1,t}(x)$, which may indicate a hit at that site.

The forward hits and the backward hits may be two co-located lists, $$C\frac{b}{T}, C\frac{f}{T},$$

of candidate interpolation motion vectors (pointing in the forward and backward temporal directions) for every site in the interpolated frame at t+Δ. In some implementations, the motion fields may include inaccuracies, the handling occlusion may be difficult, and the hit list generation may include sites at which there is more than one hit in each list, or no hits.

Figure 11:
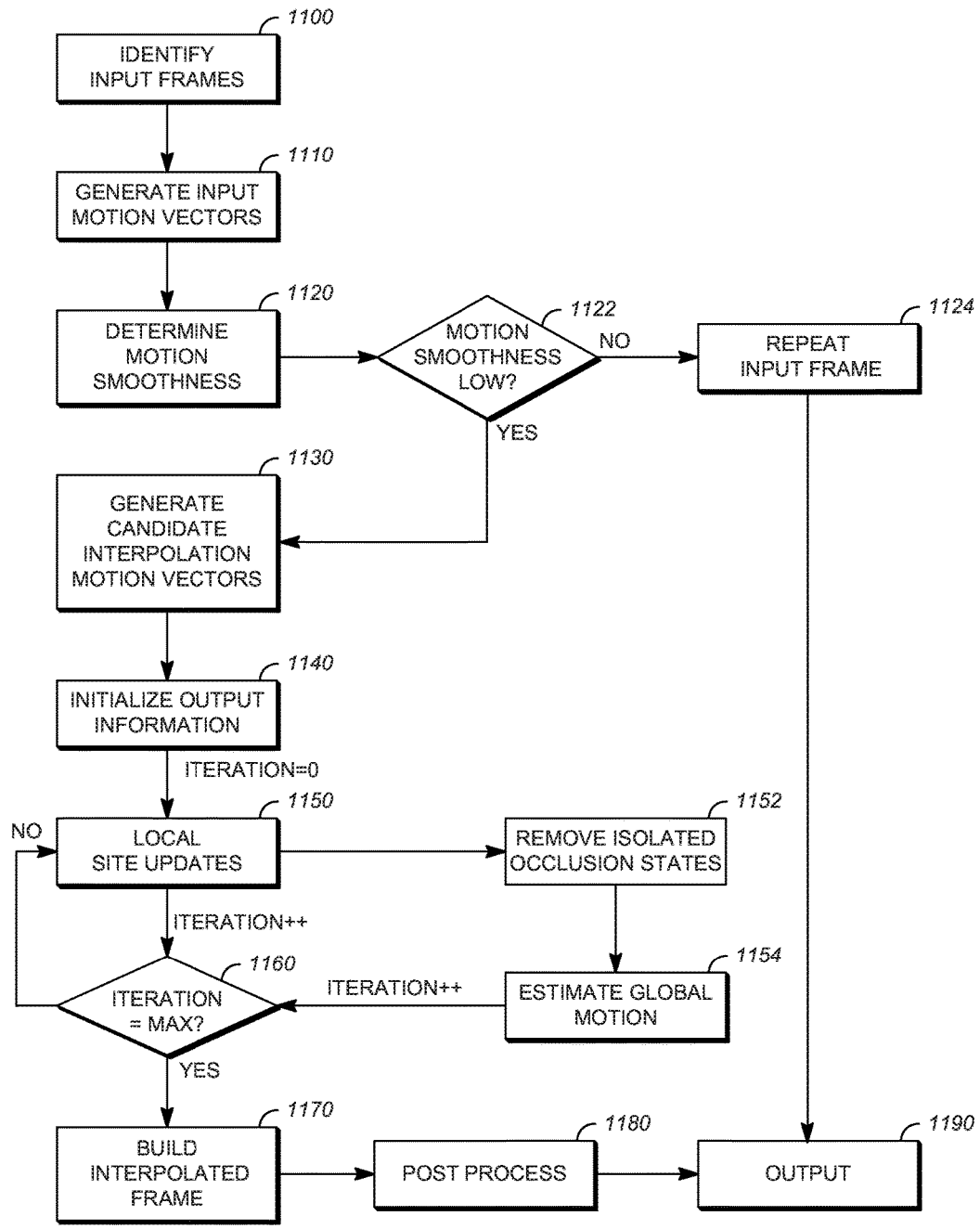
FIG. 11 shows a diagram of an example of pull frame interpolation in accordance with implementations of this disclosure.

FIG. 11 shows a diagram of an example of pull frame interpolation in accordance with implementations of this disclosure. In some implementations, pull frame interpolation may include identifying input frames at 1100, generating input motion vectors at 1110, determine motion smoothness at 1120, generating candidate interpolation motion vectors at 1130, initializing output information at 1140, performing local site updates at 1150, determining whether to build the interpolated frame at 1160, building an interpolated frame at 1170, post processing at 1180, outputting the interpolated frame at 1190, or any combination thereof. In some implementations, estimating motion at 1110, measuring smoothness at 1120, generating a hit list at 1130, or any combination thereof may be considered pre-processing and may be performed independently of the interpolation.

In some implementations, input frames, such as the input frames 810/812/814/816 shown in FIG. 8 may be identified at 1100. The sequence of frames may include a frame at position t−1, a frame at position t, a frame at position t+1, and a frame at position t+2. In some implementations, identifying the input frames may include identifying a temporal or spatial location Δ for each interpolated frame, such that the location of the interpolated frames Δ is between t and t+1.

In some implementations, motion may be generated for input frames at 1110. For example, motion fields may be computed between frame pairs t, t−1; t, t+1; t+1, t; t+1, t+2. Any motion estimation (prediction) process can be used, such as block matching or optic flow motion estimation. The motion fields may be used to initialize $d_{t;t-1}$; $d_{t;t+1}$; $d_{t+1;\ t-1}$; $d_{t+1;\ t+2}$ respectively. The motion fields may remain constant during interpolation.

In some implementations, motion smoothness may be determined at 1120. Determining motion smoothness may include determining whether the motion smoothness is low at 1122, repeating an input frame as the interpolated frame at 1124, or both. The motion fields between the existing frames of some scenes, such as badly illuminated scenes or scenes shot with a low original frame rate that include high motion content, may not be temporally or spatially consistent (low motion smoothness) and generation of a high quality interpolated frame may be unlikely. For frames exhibiting low motion smoothness an input frame, such as the frame at t or the frame at t+1, may be repeated as the interpolated frame.

Identifying temporal or spatial inconsistency (low motion smoothness) at 1122 may include determining the motion compensated motion difference between frames t and t+1 in blocks that tile the frame evenly. A grid of three blocks horizontally and two blocks vertically may be used with the block sizes scaled to tile the image frame accordingly. Each block may include $B_1 \times B_2$ sites, B may include the sites x in block b, and calculating the motion compensated motion differences in a block b, $e_m^b$ may be expressed as follows:

$$m_f(x) = |d_{t,t+1} + d_{t+1,t}(x + d_{t,t+1})| \quad \text{[Equation 15]}$$
$$m_b(x) = |d_{t+1,t} + d_{t,t+1}(x + d_{t+1,t})|$$
$$d_m^b = \frac{1}{B_1 B_2} \sum_{x \in B} \max(m_f(x), m_b(x)).$$

In Equation 15, the x in $d_{t,t+1}(x)$ is omitted for simplicity. The motion compensated motion differences may be above a smoothness constraint or threshold and an input frame such as the frame at t or the frame at t+1, may be repeated as the interpolated frame at 1124.

A motion compensated motion difference $e_m^b$ that exceeds a threshold (constraint) $\delta_b$ may indicate that the motion information is unreliable and an input frame such as the frame at t or the frame at t+1, may be repeated as the interpolated frame at 1124. In some implementations, the repeated input frame may be identified based on proximity to the interpolated frame Δ. For example, Δ may be less than or equal to 0.5 and the frame at t may be repeated. In another example, Δ may be greater than 0.5 and the frame at t+1 may be repeated. In some implementations, Δ may be greater than or equal to 0.5 and the frame at t+1 may be repeated.

In some implementations, identification of motion as consistent motion may change smoothly with the size of the frames in the video sequence. For example, a large threshold may be used for high definition pictures and a low threshold may be used for low resolution pictures. In some implementations, the threshold $\delta_b$ may be proportional to the horizontal size of the image in pixels $N_h$. For example, the threshold $\delta_b$ may be $50 \times N_h/1920$.

In some implementations, candidate interpolation motion vectors (hits) may be generated at 1130. A list of candidate interpolation motion vectors (hit list) for the interpolated frame may be based on the motion identified for the input frames. For example, the hit list may be generated as shown in FIG. 10.

In some implementations, output information may be initialized at 1140. For example, initializing the output information may include using random assignment, hit list based assignment, or a combination thereof. In some implementations, a quick initial estimate of the interpolated motion field may be generated using the hit list. In some implementations, $N_T^b(x)$ may indicate the number of temporal candidates (hits) in the backward direction and $N_T^f(x)$ may indicate the number of temporal candidates (hits) in the forward direction. The initial estimation may include scanning the sites in $t+\Delta$. The number of hits may be such that $N_T^b(x)==1)$ && $(N_T^f(x)==1)$, the motion in the lists may be assigned to the interpolated motion, and s may be set to 00. The number of hits may be such that $N_T^b(x) \geq 1)$ && $(N_T^f(x)==0)$, a first motion hit in the backward direction may be assigned to both directions of interpolated motion, and s may be set to 10. The number of hits may be such that $N_T^b(x)==0)$ && $(N_T^f(x) \geq 1)$, a first motion hit in the forward direction may be assigned to both directions of interpolated motion, and s may be set to 01. Otherwise the interpolated motion may be set to 0 and s may be set to 00. Initializing the output information may include setting an iteration counter to zero.

In some implementations, local site updates may be performed at 1150. Performing local site updates may include selecting and updating an interpolation motion vector for each site in the interpolation frame. Local site updates may be performed iteratively for each site in the interpolated frame.

In some implementations, performing local site updates may include identifying candidate interpolation motion vectors in the forward and backward directions using the hit list generated at 1130. The hit list may be empty and no forward or backwards hits may be identified. Motion at the eight proximate neighbors of the current site, as shown in FIG. 9, may be identified as motion candidates for forward and backward directions. Current motion information at the current site may be included as a candidate. The length of the forward and backward motion candidate lists may be reduced by removing vectors which are the same or similar. For example, motion vectors that have a difference that is less than a threshold, such as 0.25 pixels, may be removed. The reduced length candidate list of vectors may be referred to as $d_k^f, d_k^b$ for the kth forward and backward candidate. For example, the reduced length candidate list of vectors may include K candidate pairs. For each pair of motion candidates, three possible motion/occlusion candidates may be generated by augmenting each pair with the three possible states s=00, 01, or 10. The augmented candidate set may be referred to as $m_k^1=[d_k^f, d_k^b, s=00]$, $m_k^2=[d_k^f, d_k^b, s=01]$, $m_k^3=[d_k^f, d_k^b, s=10]$. For example, the augmented candidate set may include 3×K motion candidates. For each of the 3K motion candidates, using $e_f, e_b, e_{fb}, e_{bf}, e_d$ as indicated in Equations 4-8, $\Lambda_o=10.0$, $\Lambda_d=2.0$, and $\lambda_k=1/|v_k|$, energies may be calculated, which may be expressed as the following:

$$E_s^b = \Lambda_d \left\{ \sum_{k=0}^{K-1} \lambda_k f(|d_k^b(x) - d_{t+\Delta,t}(x+v_k)|) \right\}$$ [Equation 16]

$$E_s^f = \Lambda_d \left\{ \sum_{k=0}^{K-1} \lambda_k f(|d_k^f(x) - d_{t+\Delta,t+1}(x+v_k)|) \right\}$$

$$E_i = \left(I_t(x+d_k^b(x)) - I_{t+1}(x+d_k^f(x))\right)/(2\sigma_I^2)$$

$$E_g = \Lambda_g f(d_k - d_g)$$

$$E_x = E_s^b + E_s^f + \left(\frac{2e_d^2}{2\sigma_d^2}\right) + E_g$$

$$E_{00} = E_x + e_{fb}^2 + e_{bf}^2 + e_b^2 + e_f^2 +$$

$$\Lambda_0 \left\{ \sum_{k=0}^{K-1} \lambda_k h(00, s(x+v_k)) \right\}$$

$$E_{01} = E_x + e_b^2 + 4\alpha + \Lambda_0 \left\{ \sum_{k=0}^{K-1} \lambda_k h(01, s(x+v_k)) \right\}$$

$$E_{10} = E_x + e_f^2 + 4\alpha + \Lambda_0 \left\{ \sum_{k=0}^{K-1} \lambda_k h(10, s(x+v_k)) \right\}$$

In some implementations, performing local site updates may include assigning the motion candidate pair having the lowest energy to the interpolated motion field, which may include replacing values currently in that field. For that candidate the state value s may be indicated by the minimal energy. For example, if $E_{00}$ has minimal energy, then s=00.

In some implementations, performing local site updates may include removing isolated occlusion states at 1152, estimating global motion at 1154, or both.

Removing isolated occlusion states at 1152 may include detecting occurrences of sites at which s(x) is not equal to $s(v_k+x)$ and $s(v_k+x)$ are all the same, and replacing s(•) with the value of the neighbors. The motion at the site may be replaced with the average motion of its neighbors. Removing isolated occlusion states may reduce the occurrence of impulsive single site artifacts.

Estimating global motion at 1154 may be performed if all sites have been visited. Estimating global motion of the new estimate for the interpolated motion field may include using a global motion estimation method based on using dense motion flow. For example, the most frequently occurring motion vector, the average of all the vectors, or a polynomial fit to the vector field, may be used as the global motion of the scene.

In some implementations, whether to build the interpolated frame may be determined at 1160. Performing local site updates at 1150 may include iterating the iterations counter. If the iterations counter exceeds a threshold, such as five, the interpolated frame may be built at 1170. In some implementations, if there has been no change in any estimated motion, the interpolated frame may be built at 1170. If the iterations counter is within the threshold, there has been a change in estimated motion, or both, initializing output information at 1140, performing local site updates at 1150, and determining whether to build the interpolated frame at 1160 may be iteratively performed.

In some implementations, an interpolated frame may be built at 1170. Building the interpolated frame may include using the estimated motion and may be based on Equation 2.

In some implementations, post processing may be performed at 1180. Due to difficulty in estimating motion when that motion is fast, or the recording was taken in low light, post-processing may be performed to reduce or correct the appearance of image artifacts. These artifacts may appear as holes in the image $I_{t+\Delta}$, or strange warping of the image near large occluded or uncovered regions. Low confidence image estimates may be identified and may be blended seamlessly with the average of the future and past frames. A gradient of the motion field may be used, which may include choosing forward or backward direction depending on which is greater, as the measure of confidence in the interpolation.

Post-processing may include generating a conservative estimate for the interpolated frame using averaging $I^*(x) = (1-\Delta)I_t(x) + \Delta I_{t+1}(x)$. For simplicity, the backward interpolated motion $d_{t+\Delta,t-1}(x)$ may be expressed as $[\hat{d}_1^b(h, k), \hat{d}_2^b(h, k)]$ and the forward interpolated motion $d_{t+\Delta,t}(x)$ may be expressed as $[\hat{d}_1^f(h, k), \hat{d}_2^f(h, k)]$ where $x = [h,k]$. Measuring the motion gradient $g_m(x)$ at each site x and blending weight $w(x)$ may be expressed as follows:

[Equation 17]

$$\delta_{xx} = \max\{|d_1^b(h, k) - d_1^b(h-1, k)|, |d_1^f(h, k) - d_1^f(h-1, k)|\}$$

$$\delta_{xy} = \max\{|d_1^b(h, k) - d_1^b(h, k-1)|, |d_1^f(h, k) - d_1^f(h, k-1)|\}$$

$$\delta_{yx} = \max\{|d_2^b(h, k) - d_2^b(h-1, k)|, |d_2^f(h, k) - d_2^f(h-1, k)|\}$$

$$\delta_{yy} = \max\{|d_2^b(h, k) - d_1^b(h, k-1)|, |d_2^f(h, k) - d_2^f(h, k-1)|\}$$

$$g_m(x) = \delta_{xx} + \delta_{xy} + \delta_{yx} + \delta_{yy}$$

$$w(x) = \begin{cases} 0 & : g_m(x) > \delta_t \\ 1 & : \text{Otherwise} \end{cases}$$

For example, $\delta_t = 4$ may be used.

A final output picture may be calculated using $\hat{I}(x) = w(x) I^*(x) + (1-w(x))I_{t+\Delta}(x)$, which may be a weighted blend between the non-motion compensated average picture $I^*$ and the output picture from the previous stage $I_{t+\Delta}$. In some implementations, an interpolated frame may be output at 1190.

Equation 1 is shown as an example and other reconstruction methods may be used, such as a median (or other order statistic) operation on a volume of pixels extracted around them motion compensated sites in the previous and next frames.

Although not shown in FIG. 11, in some implementations, pull frame interpolation may include using a multiresolution scheme. For example, a scene may include large motion and a multiresolution scheme may be used. Using a multiresolution scheme may include performing pull frame interpolation as shown in FIG. 11 to a coarse block based motion field. Each site may be processed as a block of B×B pixels (B=3,4,8,16,4 depending on the size of the picture). Site image differences may become the average pixel intensity difference. The interpolated block motion field at the coarse level may be used to initialize iterations at a next, finer, level. For example, processing a high definition video sequence (1920×1080) may include generating images of size 960×540, 480×270, 240×135, 120×72, 60×36, or any combination thereof, and using block size B=4 at all levels of the image pyramid. At the highest scale, when the iterations are complete, the block based vector field may be used as the final interpolated motion field.

Figure 12:
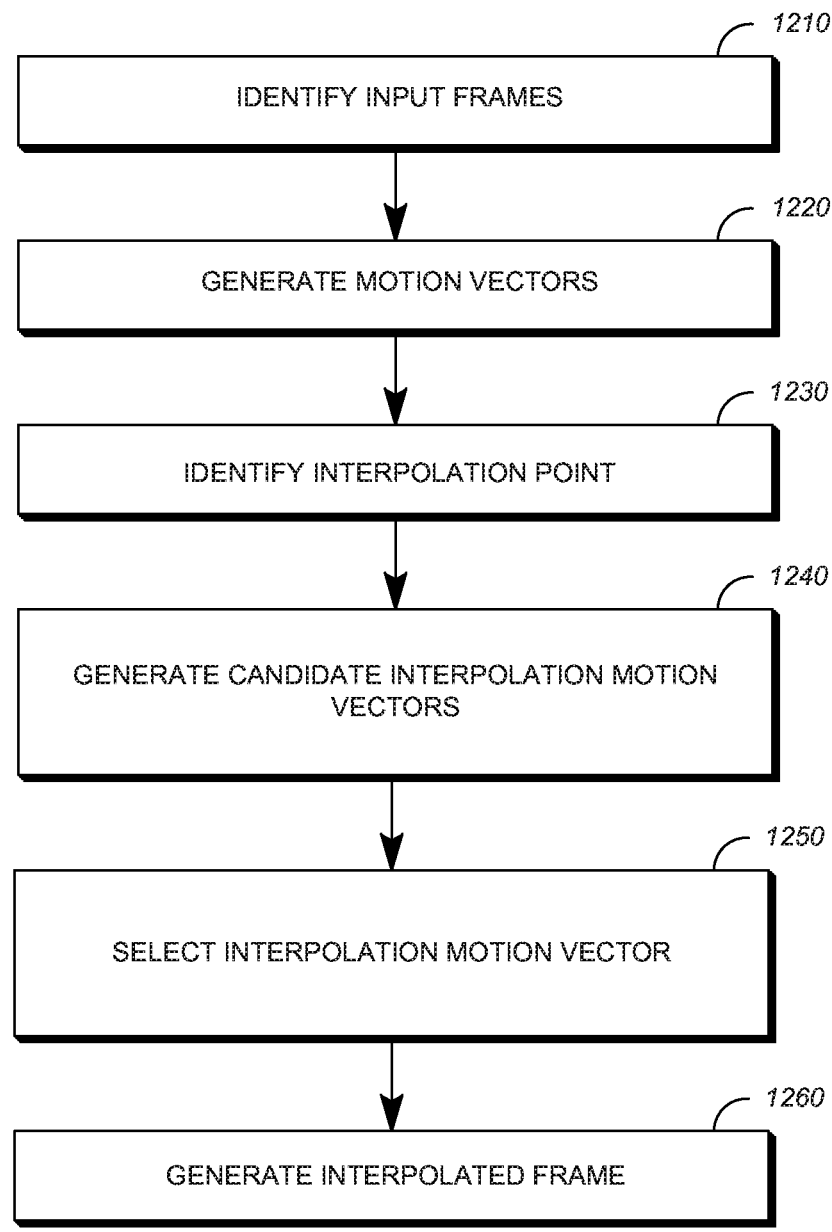
FIG. 12 shows a simplified diagram of an example of pull frame interpolation in accordance with implementations of this disclosure.

FIG. 12 shows a simplified diagram of an example of pull frame interpolation in accordance with implementations of this disclosure. In some implementations, pull frame interpolation may include identifying input frames at 1210, generating motion vectors at 1220, identifying an interpolation point at 1230, generating candidate interpolation motion vectors at 1240, selecting an interpolation motion vector at 1250, generating an interpolated frame at 1260, or any combination thereof.

In some implementations, input frames may be identified at 1210. Identifying input frames may identifying frames, such as the input frames 810/812/814/816 shown in FIG. 8, such that an identified sequence of frames includes a frame at position t−1, a frame at position t, a frame at position t+1, and a frame at position t+2.

In some implementations, motion vectors may be generated at 1220, which may be similar to estimating motion at 1110 in FIG. 11. Generating the motion vectors may include additional processing, such as measuring motion smoothness as shown in FIG. 11 at 1120, determining whether the motion smoothness is low as shown in FIG. 11 at 1122, repeating an input frame as the interpolated frame at as shown in FIG. 11 at 1124, or any combination thereof.

In some implementations, an interpolation point may be identified at 1230. Identifying an interpolation point may include identifying a temporal or spatial location Δ for each interpolated frame, such that the location of the interpolated frames Δ is between t and t+1.

In some implementations, candidate interpolation motion vectors may be generated at 1240. Generating candidate interpolation motion vectors may include generating a hit list as shown in FIG. 11 at 1130.

In some implementations, an interpolation motion vector may be selected at 1250. Selecting an interpolation motion vector may include initializing output information as shown in FIG. 11 at 1140, performing local site updates as shown in FIG. 11 at 1150, determining whether to build the interpolated frame as shown in FIG. 11 at 1160, or any combination thereof.

In some implementations, an interpolated frame may be generated at 1260. Generating the interpolated frame may include building an interpolated frame as shown in FIG. 11 at 1170, post processing as shown in FIG. 11 at 1180, outputting the interpolated frame as shown in FIG. 11 at 1190, or any combination thereof.

Other implementations of the diagram of pull frame interpolation as shown in FIG. 12 are available. In implementations, additional elements of pull frame interpolation can be added, certain elements can be combined, and/or certain elements can be removed. For example, in an implementation, a first pass pull frame interpolation may be performed on a course block based motion field and a second pass pull frame interpolation may be performed using the output of the first pass to generate an interpolated frame.

Pull frame interpolation, or any portion thereof, can be implemented in a device, such as the computing device 100 shown in FIG. 1. For example, an encoder, such as the encoder 400 shown in FIG. 4, can implement pull frame interpolation, or any portion thereof, using instruction stored on a tangible, non-transitory, computer readable media, such as memory 150 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of encoding, decoding, and frame interpolation described herein illustrate some exemplary frame interpolation techniques. However, it is to be understood that encoding and decoding, as those terms are used herein may include compression, decompression, transformation, or any other processing or change of data, and that the terms frame interpolation and pull frame interpolation, as those terms are used herein, may include generating one or more new frames between two original frames, such that the new frame depicts content at a time or space not captured by the original frames.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
identifying a plurality of input video frames from an input video sequence;
generating a first plurality of motion vectors indicating motion from a first frame of the plurality of input video frames to a second frame of the plurality of input video frames;
generating a second plurality of motion vectors indicating motion from the second frame to the first frame;
identifying a frame interpolation point between the first frame and the second frame;
generating an interpolated frame at the frame interpolation point based on interpolated motion information using pull frame interpolation, wherein pull frame interpolation includes:
generating the interpolated motion information by interpolating the interpolated motion information based on the first plurality of motion vectors and the second plurality of motion vectors, wherein the interpolated motion information indicates interpolated motion from the first frame to the frame interpolation point and from the second frame to the frame interpolation point, wherein generating the interpolated motion information includes:
identifying a location in the interpolated frame;

determining whether the first plurality of motion vectors includes a forward motion vector that intersects with the location in the interpolated frame;
determining whether the second plurality of motion vectors includes a backward motion vector that intersects with the location in the interpolated frame;
in response to a determination that the first plurality of motion vectors includes the forward motion vector:
identifying the forward motion vector as a candidate forward motion vector;
in response to a determination that the second plurality of motion vectors includes the backward motion vector, identifying the backward motion vector as a first candidate backward motion vector; and
in response to a determination that the second plurality of motion vectors omits the backward motion vector, identifying the forward motion vector as a first candidate backward motion vector; and
in response to a determination that the first plurality of motion vectors omits the forward motion vector:
in response to the determination that the second plurality of motion vectors includes the backward motion vector:
identifying the backward motion vector as a first candidate forward motion vector; and
identifying the backward motion vector as a first candidate backward motion vector; and
in response to the determination that the second plurality of motion vectors omits the backward motion vector:
identifying a zero motion vector as the first candidate forward motion vector; and
identifying the zero motion vector as the first candidate backward motion vector; and
outputting a modified video sequence including the interpolated frame sequentially between the first frame and the second frame.

2. The method of claim 1, wherein the first frame is temporally concurrent with the second frame and the frame interpolation point.

3. The method of claim 1, wherein the plurality of input video frames includes an input video spatial sequence such that the first frame includes content captured from a first angle in the input video spatial sequence and the second frame includes content captured from a second angle in the input video spatial sequence, wherein the first angle is adjacent to the second angle in the input video spatial sequence, and wherein the frame interpolation point indicates a third angle between the first angle and the second angle.

4. The method of claim 1, wherein generating the interpolated motion information includes:
identifying a motion vector from an adjacent location in the first frame as a second candidate forward motion vector; and
identifying the motion vector from the adjacent location in the first frame as a second candidate backward motion vector.

5. The method of claim 4, wherein generating the interpolated motion information includes:
identifying a plurality of candidate motion vector pairs including:
a combination of the first candidate forward motion vector and the first candidate backward motion vector as a first candidate motion vector pair;
a combination of the first candidate forward motion vector and the second candidate backward motion vector as a second candidate motion vector pair;
a combination of the second candidate forward motion vector and the first candidate backward motion vector as a third candidate motion vector pair; and
a combination of the second candidate forward motion vector and the second candidate backward motion vector as a fourth candidate motion vector pair.

6. The method of claim 5, wherein generating the interpolated motion information includes:
identifying a plurality of occlusion states including:
a first occlusion state;
a second occlusion state; and
a third occlusion state; and
identifying a plurality of candidate motion vector pair occlusion state combinations including each distinct combination of a respective occlusion state from the plurality of occlusion states and a respective candidate motion vector pair from the plurality of candidate motion vector pairs.

7. The method of claim 6, wherein generating the interpolated motion information includes:
identifying first global motion information; and
pull frame interpolation motion optimizing using the first global motion information as current global motion information and using the plurality of candidate motion vector pair occlusion state combinations as a current plurality of candidate motion vector pair occlusion state combinations.

8. The method of claim 7, wherein pull frame interpolation motion optimizing includes:
including a locally optimized candidate motion vector pair from the current plurality of candidate motion vector pair occlusion state combinations in an updated plurality of candidate motion vector pair occlusion state combinations based on the current global motion information;
identifying updated global motion information based on the updated plurality of candidate motion vector pair occlusion state combinations; and
pull frame interpolation motion optimizing using the updated global motion information as the current global motion information and using the updated plurality of candidate motion vector pair occlusion state combinations as the current plurality of candidate motion vector pair occlusion state combinations.

9. The method of claim 8, wherein generating the interpolated motion information includes:
using motion information from the current plurality of candidate motion vector pair occlusion state combinations as the interpolated motion information.

10. A method comprising:
identifying a plurality of input video frames from an input video sequence;
generating a first plurality of motion vectors indicating motion from a first frame of the plurality of input video frames to a second frame of the plurality of input video frames;
generating a second plurality of motion vectors indicating motion from the second frame to the first frame;
wherein the first frame is temporally concurrent with the second frame and a frame interpolation point;
generating an interpolated frame at the frame interpolation point based on interpolated motion information using pull frame interpolation, wherein pull frame interpolation includes:

generating the interpolated motion information by interpolating the interpolated motion information based on the first plurality of motion vectors and the second plurality of motion vectors, wherein the interpolated motion information indicates interpolated motion from the first frame to the frame interpolation point and from the second frame to the frame interpolation point, wherein generating the interpolated motion information includes:
identifying a location in the interpolated frame;
determining whether the first plurality of motion vectors includes a forward motion vector that intersects with the location in the interpolated frame;
determining whether the second plurality of motion vectors includes a backward motion vector that intersects with the location in the interpolated frame;
in response to a determination that the first plurality of motion vectors includes the forward motion vector:
identifying the forward motion vector as a candidate forward motion vector;
in response to a determination that the second plurality of motion vectors includes the backward motion vector, identifying the backward motion vector as a first candidate backward motion vector; and
in response to a determination that the second plurality of motion vectors omits the backward motion vector, identifying the forward motion vector as a first candidate backward motion vector; and
in response to a determination that the first plurality of motion vectors omits the forward motion vector:
in response to the determination that the second plurality of motion vectors includes the backward motion vector:
identifying the backward motion vector as a first candidate forward motion vector; and
identifying the backward motion vector as the first candidate backward motion vector; and
in response to the determination that the second plurality of motion vectors omits the backward motion vector:
identifying a zero motion vector as the first candidate forward motion vector; and
identifying the zero motion vector as the first candidate backward motion vector; and
outputting a modified video sequence including the interpolated frame sequentially between the first frame and the second frame.

11. The method of claim 10, wherein the plurality of input video frames includes an input video spatial sequence such that the first frame includes content captured from a first angle in the input video spatial sequence and the second frame includes content captured from a second angle in the input video spatial sequence, wherein the first angle is adjacent to the second angle in the input video spatial sequence, and wherein the frame interpolation point indicates a third angle between the first angle and the second angle.

12. The method of claim 10, wherein generating the interpolated motion information includes:
identifying a motion vector from an adjacent location in the first frame as a second candidate forward motion vector; and
identifying the motion vector from the adjacent location in the first frame as a second candidate backward motion vector.

13. The method of claim 12, wherein generating the interpolated motion information includes:
identifying a plurality of candidate motion vector pairs including:
a combination of the first candidate forward motion vector and the first candidate backward motion vector as a first candidate motion vector pair;
a combination of the first candidate forward motion vector and the second candidate backward motion vector as a second candidate motion vector pair;
a combination of the second candidate forward motion vector and the first candidate backward motion vector as a third candidate motion vector pair; and
a combination of the second candidate forward motion vector and the second candidate backward motion vector as a fourth candidate motion vector pair.

14. The method of claim 13, wherein generating the interpolated motion information includes:
identifying a plurality of occlusion states including: a first occlusion state;
a second occlusion state; and a third occlusion state; and
identifying a plurality of candidate motion vector pair occlusion state combinations including each distinct combination of a respective occlusion state from the plurality of occlusion states and a respective candidate motion vector pair from the plurality of candidate motion vector pairs.

15. The method of claim 14, wherein generating the interpolated motion information includes:
identifying first global motion information; and
pull frame interpolation motion optimizing using the first global motion information as current global motion information and using the plurality of candidate motion vector pair occlusion state combinations as a current plurality of candidate motion vector pair occlusion state combinations.

16. The method of claim 15, wherein pull frame interpolation motion optimizing includes:
including a locally optimized candidate motion vector pair from the current plurality of candidate motion vector pair occlusion state combinations in an updated plurality of candidate motion vector pair occlusion state combinations based on the current global motion information;
identifying updated global motion information based on the updated plurality of candidate motion vector pair occlusion state combinations; and
pull frame interpolation motion optimizing using the updated global motion information as the current global motion information and using the updated plurality of candidate motion vector pair occlusion state combinations as the current plurality of candidate motion vector pair occlusion state combinations.

17. The method of claim 16, wherein generating the interpolated motion information includes:
using motion information from the current plurality of candidate motion vector pair occlusion state combinations as the interpolated motion information.

18. A method comprising:
identifying a plurality of input video frames from an input video sequence;
generating a first plurality of motion vectors indicating motion from a first frame of the plurality of input video frames to a second frame of the plurality of input video frames, wherein the first frame is temporally immediately adjacent to the second frame;

generating a second plurality of motion vectors indicating motion from the second frame to the first frame;

identifying a frame interpolation point temporally between the first frame and the second frame;

generating an interpolated frame at the frame interpolation point based on interpolated motion information using pull frame interpolation, wherein pull frame interpolation includes:

generating the interpolated motion information by interpolating the interpolated motion information based on the first plurality of motion vectors and the second plurality of motion vectors, wherein the interpolated motion information indicates interpolated motion from the first frame to the frame interpolation point and from the second frame to the frame interpolation point, wherein generating the interpolated motion information includes:

identifying a location in the interpolated frame;

determining whether the first plurality of motion vectors includes a forward motion vector that intersects with the location in the interpolated frame;

determining whether the second plurality of motion vectors includes a backward motion vector that intersects with the location in the interpolated frame;

in response to a determination that the first plurality of motion vectors includes the forward motion vector:

identifying the forward motion vector as a candidate forward motion vector, in response to a determination that the second plurality of motion vectors includes the backward motion vector, identifying the backward motion vector as a first candidate backward motion vector; and in response to a determination that the second plurality of motion vectors omits the backward motion vector, identifying the forward motion vector as a first candidate backward motion vector; and in response to a determination that the first plurality of motion vectors omits the forward motion vector:

in response to the determination that the second plurality of motion vectors includes the backward motion vector:

identifying the backward motion vector as a first candidate forward motion vector; and identifying the backward motion vector as the first candidate backward motion vector; and in response to the determination that the second plurality of motion vectors omits the backward motion vector:

identifying a zero motion vector as the first candidate forward motion vector; and identifying the zero motion vector as the first candidate backward motion vector; and outputting a modified video sequence including the interpolated frame sequentially between the first frame and the second frame.

* * * * *